(12) United States Patent
Morovic et al.

(10) Patent No.: US 9,686,444 B2
(45) Date of Patent: Jun. 20, 2017

(54) COLOR SEPARATION AND PRINTING

(75) Inventors: Jan Morovic, Colchester (GB); Peter Morovic, Barcelona (ES); Juan Manuel Garcia Reyero Viñas, Sant Cugat (ES); Alejandro Manuel de Peña Hempel, Sant Cugat del Valles (ES); Utpal Kumar Sarkar, Barcelona (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 891 days.

(21) Appl. No.: 13/546,668

(22) Filed: Jul. 11, 2012

(65) Prior Publication Data

US 2014/0016143 A1 Jan. 16, 2014

(51) Int. Cl.
*H04N 1/60* (2006.01)

(52) U.S. Cl.
CPC .................. *H04N 1/6016* (2013.01)

(58) Field of Classification Search
None
See application file for complete search history.

(56) References Cited

U.S. PATENT DOCUMENTS

| | | | |
|---|---|---|---|
| 8,125,687 B2 | 2/2012 | Tin | |
| 2005/0094169 A1* | 5/2005 | Berns et al. | 358/1.9 |
| 2006/0193018 A1* | 8/2006 | Ito et al. | 358/518 |
| 2006/0232806 A1* | 10/2006 | Holub | 358/1.9 |
| 2006/0285742 A1* | 12/2006 | Arai et al. | 382/162 |
| 2010/0214576 A1 | 8/2010 | Morovic et al. | |
| 2011/0063632 A1 | 3/2011 | Klassen et al. | |
| 2011/0069334 A1 | 3/2011 | Hoshii et al. | |
| 2011/0096344 A1 | 4/2011 | Morovic et al. | |
| 2011/0096364 A1 | 4/2011 | Morovic et al. | |
| 2012/0090488 A1 | 4/2012 | Postle et al. | |
| 2012/0133961 A1* | 5/2012 | Henderson | 358/1.9 |

OTHER PUBLICATIONS

M. Assefa, Kubelka Munk theory for efficient spectral printer modelling, Master Thesis Report, Gjovik University College, Norway, Jul. 1, 2010.
R. Balasubramanian, et al., A method for quantifying the color gamut of an output device, Proc. SPIE, vol. 3018, pp. 110-116, (1997).
R. Balasubramanian, The use of spectral regression in modeling halftone color printers, Proc. IS&T/OSA Annual Conference, Optics & Imaging in the Information Age, pp. 372-375, 1996.

* cited by examiner

*Primary Examiner* — Richard Zhu
(74) *Attorney, Agent, or Firm* — Trop, Pruner & Hu, P.C.

(57) ABSTRACT

The present disclosure relates to a computer implemented method for color separation for a printer, systems, and methods for printing using a printer. In some examples, the method for color separation for a printer comprises
  forming a color gamut for the printer in the form of a hull in a color space, the hull having vertices corresponding to Neugebauer Primaries,
  predicting the colorimetry in the color space of at least one Neugebauer Primary lying outside of an ink limit for the printer,
  determining the Neugebauer Primary area coverages that can produce a desired color in the color space using at least one Neugebauer Primary lying outside of the ink limit.

15 Claims, 8 Drawing Sheets

COLOR SEPARATION AND PRINTING

Color printing sometimes involves a color separation and a halftoning process. For a particular digital color image that a printer is to print, the printing process may involve converting the colors in the image to a set of color combinations of the printer's inks, and then converting these color combinations to a halftone pattern, such that the image can be printed. In some printers, the color separation has used Neugerbauer Primary area coverage vectors. In some cases, a printer is restricted to printing colors within a color limit.

DETAILED DESCRIPTION

Before examples of the present invention are disclosed and described, it is to be understood that this invention is not limited to the particular process steps and devices disclosed herein because such process steps and devices may vary somewhat. It is also to be understood that the terminology used herein is used for the purpose of describing particular examples only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

Unless otherwise stated, any feature described herein can be combined with any aspect or any other feature described herein.

This disclosure describes various systems and methods. In some examples, the systems and/or methods may be used in the printing of a document in a printing system. In particular, this disclosure describes using Neugebauer Primaries (NPs) and Neugebauer Primary area coverages (NPacs) in various processes, including printing processes.

In some examples, the Neugebauer Primaries are the possible combinations of a set of n inks. Each ink within the set may be at one of k levels for a single halftone pixel, where there are $k^n$ combinations for each ink set defining all of the possible ink configuration states that a single halftone pixel can have. For example, where k=2 for a binary (or bi-level) printer, the printer is able to use either no ink or one drop of ink at a single pixel per ink channel. For example, where n=2 the printer would have two ink channels, for example C and M. The possible combinations would then be White (W), C, M and CM, being $k^n=2^2=4$ possible combinations. For example, for a printer comprising six different inks and the ability to place either 0, 1, or 2 drops of each ink at each halftone pixel, resulting in $3^6$ or 729 NPs. A certain color may correspond to a certain Neugebauer Primary area coverage (which may be termed NPac). A Neugebauer Primary area coverage, for a color, may be defined as the relative percentage area covered by each Neugebauer Primary forming the color. In some examples, the Neugebauer Primary area coverage (which may be termed T) may be expressed as a weighted sum, wherein $T=\Sigma T(NP_i)*\alpha_i$, where $T\epsilon\{X, Y, Z\}$, $\alpha_i$ is the percentage area coverage of the i-th Neugebauer Primary, and $T(NP_i)$ a tristimulus value (or some non-linear transformation of a tristimulus value, such as using the Yule-Nielsen method) of that same NP. The Neugebauer Primary area coverage may be expressed as a vector of the Neugebauer Primaries forming the color. As an example, a NPac may be expressed as a vector, wherein, for example [W, C, M, CM]=[a(area)$_W$%, a$_C$%, a$_M$%, a$_{CM}$%], where a$_W$%+a$_C$%+a$_M$%+a$_{CM}$%/100%.

NPacs may be represented by linear, convex combinations of NPs, wherein the relative area coverages over a unit area are the convex weights. An NPac may also represent a single NP, that NP having a 100% area coverage weight and the other NPs being at 0%. In some examples, all of a printing system's NPacs are accessible, so the full color gamut of a printing system can be addressed.

The present disclosure may relate to printing and measuring up to all of an ink set's Neugebauer primaries (NPs), computing a convex hull of the measurements, tessellating the convex hull using at least the convex hull vertices, and for any color inside the convex hull, finding the enclosing tetrahedron and determining the weights with which the vertices can be combined to give the chosen color, where the weights are the relative area coverages for each of the vertex NPs. The present disclosure may further relate to finding NPacs that are optimized according to a certain print attribute, wherein the print attribute may for example be a minimal ink usage, grain, color constancy, or another attribute. A convex hull of colors available on a system may be addressed, wherein the NPs are optimized for minimal ink usage.

Figure 1:
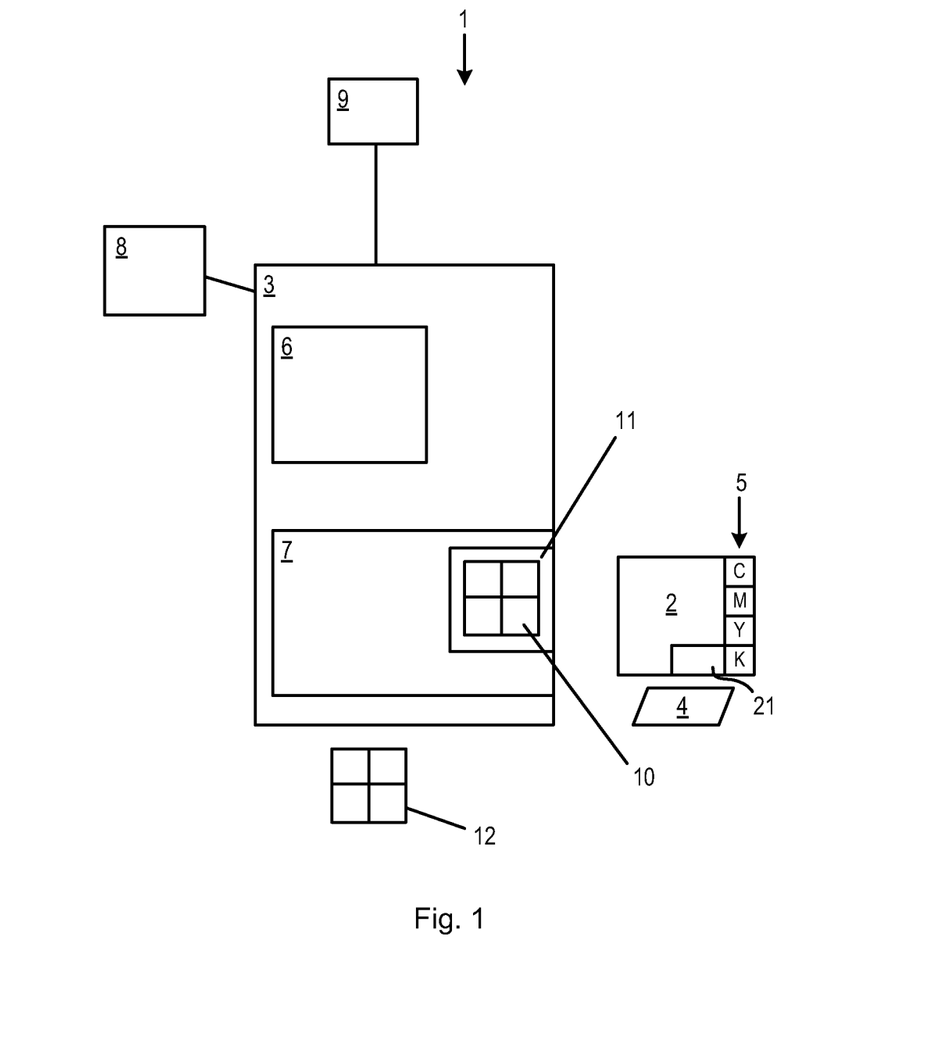
FIG. 1 illustrates schematically an example of a print system.

FIG. 1 illustrates an example of a printing system 1. The printing system may be adapted to carry out a method for color separation and/or a method of printing described herein. The print system 1 may comprise a printer 2 of a predetermined type. Without intending to limit to a specific type of printer 2, the printer 2 may comprise a large or small format printer, a dry toner printer, a liquid toner printer, an inkjet printer, an offset printer, a digital press, a dot-matrix printer, a line printer, and/or a solid ink printer.

The printing system 1 can be driven, at least in part, by one or more suitable computing devices 3. Computing devices 3 that may be used include, but are not limited to, a personal computer, a laptop computer, a desktop computer, a digital camera, a personal digital assistance device, a cellular phone, a video player, and other types of image sources.

The printer 2 may comprise a print head arranged to print on a substrate 4. The substrate 4 may comprise any type of substrate, for example, but not limited to, paper, films, foils, textiles, fabrics or plastics. The printer 2 may comprise, or be connected to, a certain ink set 5. The ink set 5 may comprise a predetermined number of inks, for example four inks which may be Cyan, Magenta, Yellow and Black (CMYK). The ink set 5 may be determined by the printer 2, wherein different printers 2 correspond to different ink sets 5, or different ink sets 5 may be applied in one printer 2.

The computing device 3 may be physically integrated with or connected to the printer 2. The computing device 3 may be arranged to process image data. The computing device 3 may be arranged to separate and/or convert colors. The computing device 3 may comprise a processing circuit 6 and a storage device 7. The storage device 7 may facilitate any type of computer data storage. The storage device 7 may comprise, but should not be limited to, any type non-volatile memory such as a hard disk, a solid state storage device, a ROM (Read Only Memory), an exchangeable data carrier, etc. The storage device 7 may store data, drivers, and computer programs, amongst others.

For example, an image for printing may be retrieved from the storage device 7, a remote storage location 8, such as an online application, using the Internet, and/or a local area network. Furthermore, a graphical user interface 9 may be provided for allowing an operator to change or interact with the print system 1.

This disclosure may relate to facilitating a color separation. The color separation may allow using at least one Neugebauer Primary lying outside of an ink limit of the printer to be used in a printing process. The printer 2 may comprise a reader 21 that can determine the colorimetry of a color patch printed by the printer 2. The reader 21 may be a spectrophotometer capable of measuring the spectral reflectance and/or CIE XYZ tristimulus values of a color patch.

In some examples, a color separation table 10 may be provided, comprising NPacs optimized for a print parameter, including, but not limited to, minimal ink usage. The color separation table 10 may be stored in a print system driver, for example a printer driver 11. The color separation table may include NPacs that include predicted NPs that lie outside of an ink limit in the printer. The storage device 7 may store the table 10. The table 10 may be stored in software running on the computing device 3, and/or on a remote storage location 8. In this description, a method and system of using such table 10 will be described, as well as a method and system of obtaining such table 10.

Certain features of the print system 1 may influence an outgoing image color for a given color input value, for example an input RGB value. For example, a specific ink set 5, and/or substrate 4 may influence the actual printed color. Therefore, the color separation table 10 may be calculated for specific print system 1, for example for specific printers 2, ink sets 5 and/or substrates 4. The system may further comprise a predetermined halftone data chart 12 containing predetermined pairs of halftone data and corresponding color values that are optimal for a certain print system 1.

The printing system 1 may employ an example of a color separation interface and image processing system, which may be referred to as a Halftone Area Neugebauer Separation (HANS).

Figure 2:
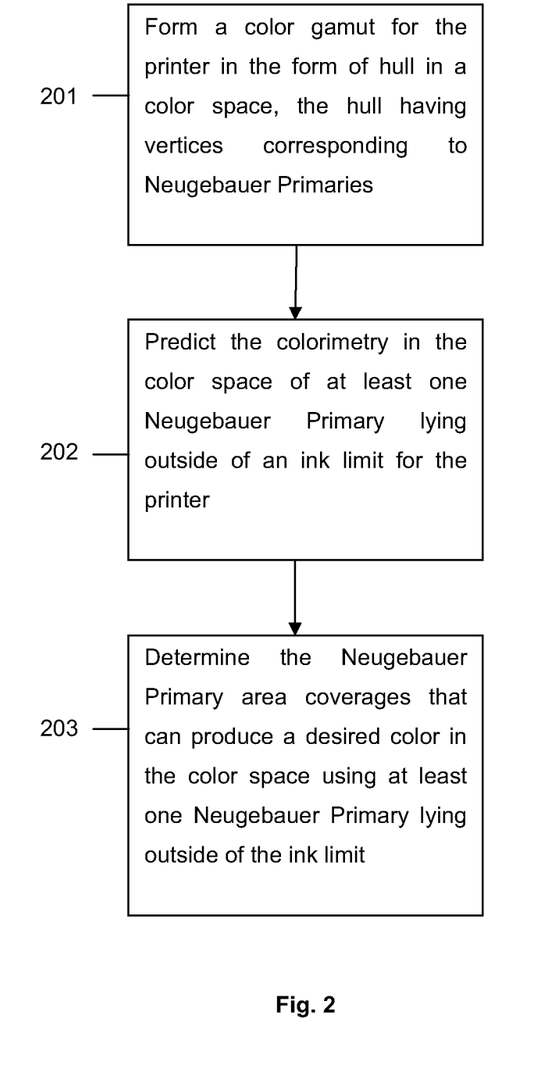
FIG. 2 illustrates schematically an example of a method for color separation for a printer as described herein.

FIG. 2 illustrates schematically an example of a computer implemented method for color separation for a printer. Step 201 involves forming a color gamut for the printer in the form of a hull in a color space, the hull having vertices corresponding to Neugebauer Primaries. The color space may be an n-dimensional color space in which each dimension n corresponds to one of the variables in the color space. In some examples, the color space is a three-dimensional color space, with each of the dimensions corresponding to one of the variables of the color space. The color space may, in some examples, be a CIE XYZ color space or a CIE L*a*b*.

A color gamut is a range of colors producible or available in a printing process or with a given device. Thus, different color reproduction techniques and different printing systems have different color capabilities or gamuts.

The hull of the gamut in an n-dimensional space can be either convex or concave. Traditionally, print colors controlled using ink amounts often result in a concave surface of the hull. A concave hull exhibits a more limited range of colors than a convex hull. Accordingly, the hull may be a convex hull.

The method may involve tessellation of the Neugebauer Primaries in the hull. A tessellation is a collection of polytopes (e.g., polygons in two dimensions, polyhedra in three dimensions) that fill a hull of the color gamut with no overlaps or gaps. In some examples, the tessellation is performed using the Delaunay Tessellation technique. In other examples, other tessellation techniques may be used. The NPs may be combined convexly and relate to colorimetry in a linear color space. Accordingly, the tessellation technique may be any geometric tessellation technique.

In some examples, a set of tetrahedra that span the convex hull of the color gamut are determined. The set may be extended to include a Neugebauer Primary or a plurality of Neugebauer Primaries lying outside of an ink limit. For any color within a hull that is accessible, a tetrahedron that encompasses that color can be found. A Neugebauer Primary area coverage (NPac) can be determined from the tetrahedron. For example, by expressing that color in terms of the corresponding barycentric coordinates defined by the vertices of the enclosing tetrahedron, the barycentric coordinates are the area coverages for the corresponding tetrahedron vertex NPs, or NPacs. Given any pair of NPac vectors, any color along the line between their colors in the color space can be obtained by, resulting in a smooth transition between the various colors in the color space. In some examples, for a desired color, a plurality of NPac vectors can be determined, each formed from a different combination of NPs.

For this color, the NPac vectors can be compared against a predetermined criterion, for example for the amount of ink usage, and a NPac vector selected according to the criterion. In some examples, at least one of the Neugebauer Primaries of a tetrahedron lies outside of an ink limit of the printer.

The color gamut may be defined by an ink limit. An ink limit may be, for a given unit area, a maximum amount of ink that can be applied to the unit area. A Neugebauer Primary may lie outside of the ink limit if, when printing the color corresponding to the Neugerbauer primary over the unit area, the total amount of ink printed in the unit area exceeds the ink limit. Prior to the present application, the colorimetry of a Neugebauer Primary lying outside of an ink limit would typically not be known, since the printer would typically be prevented, according to internal instructions, from printing Neugebauer Primaries lying outside of the ink limit, and hence colorimetry could not be measured. In these circumstances, a printer may have used an approximation in that it may compute an NPac that uses a maximum amount of ink, in other words that is on the ink limit (and thought to lie reasonably close in colorimetry to a NP that lies outside of the ink limit), and that is a linear combination of an NPs that are within or on the ink limit. This would be used to approximate an NP that lies outside of an ink limit, but would not give the colorimetry of the Neugebauer Primary lying outside of the ink limit. In this circumstance, the ink limit NPacs may be computed using quadratic programming for the mapping on the ink limit, and Delaunay tessellation for the conversion to NPac.

Step 202 involves predicting or calculating the colorimetry in the color space of at least one Neugebauer Primary lying outside of an ink limit for the printer. Once the colorimetry in the color space of the Neugebauer Primary lying outside of the ink limit has been predicted or calculated, NPac vectors can be formed using such a Neugebauer Primary. Step 203 illustrates determining the Neugebauer Primary area coverages that can produce a desired color in the color space using at least one Neugebauer Primary lying outside of the ink limit.

The formation of NPac vectors can be as described above, for example NPacs may be represented by linear, convex combinations of NPs, wherein the relative area coverages over a unit area are the convex weights. While the printing of a Neugebauer In an example, printing a Neugebauer Primary lying outside of an ink limit may not be possible across the whole of a given unit area, it may be possible to print such a Neugebauer Primary in a smaller area than the unit area, and ensure that less ink is printed in the surrounding portion, such that, over the whole unit area, the ink limit is not exceeded. In some examples, a desired color may be formed using any one of a plurality of NPac vectors. In some examples, the method may involve comparing each of the plurality of NPacs, at least one of which uses a NP falling outside of the ink limit and selecting one of the NPacs according to a predetermined criterion.

In some examples, the predicting of the colorimetry in the color space of the at least one Neugebauer Primary lying outside of an ink limit for the printer is based on the size, shape and distribution of the ink drops that are printed on a substrate by the printer.

In some examples, the predicting of the colorimetry in the color space of the at least one Neugebauer Primary lying outside of an ink limit for the printer is based on the overlap of ink drops that are printed on a substrate by the printer.

Figure 3:
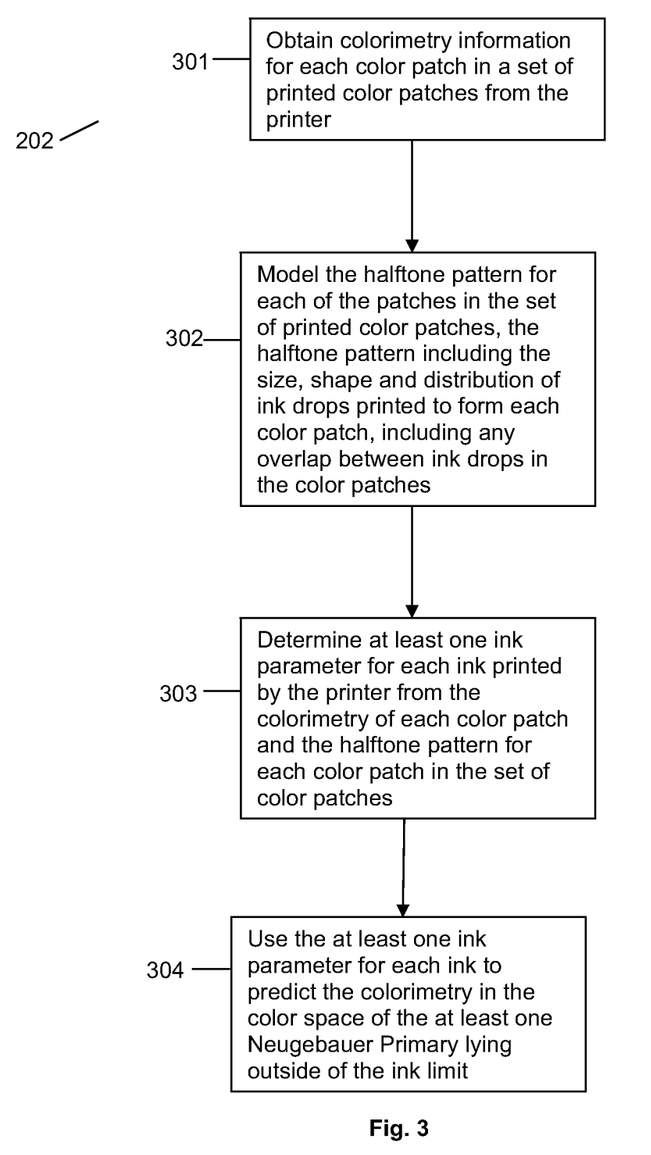
FIG. 3 illustrates schematically an example of step 202 of the method shown in FIG. 2.

FIG. 3 illustrates an example of step 202 in FIG. 2. Step 301 involve obtaining colorimetry information for each color patch in a set of printed color patches from the printer. The color patches may each be selected from a color patch formed from single NP, a color patch formed from a plurality of NPs, a color patch formed from a single ink from an ink set in the print, a color patch formed from a plurality of inks from the ink set of a printer.

Figure 7A:
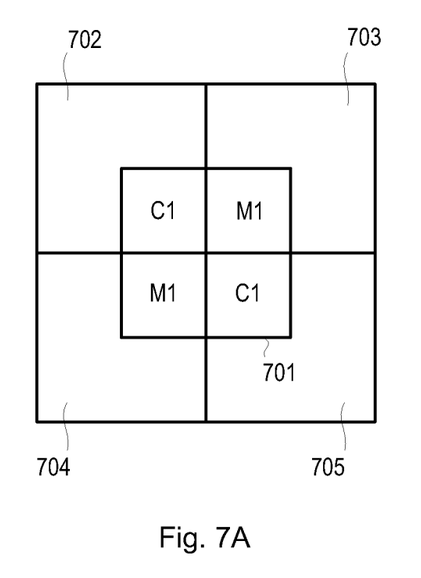
FIG. 7A illustrates a synthetic, or digital, Neugebauer Primary area coverage model formed from drops of ink 702, 703, 704 and 705 printed on a substrate.

Step 302 involves modelling the halftone pattern for each of the patches in the set of printed color patches. In this step, the halftone pattern may include the size, shape and distribution of ink drops printed to form each color patch, including any overlap between ink drops in the color patches. The modelled halftone pattern for a given printed color may be a more accurate version of the distribution of drops. A printer may, for example, contain a synthetic or digital basic pattern for a given Neugebauer Primary area coverage vector that is used to print a color patch, which may not allow for overlap of drops—such a basic model may be as shown in FIG. 7A. However, in the present method, the inventors have found it more effective to model the actual drop pattern for a given printed color patch using a more accurate model of drop size, shape and distribution. This can allow for overlap between adjacent drops, as shown in an example in FIG. 7B. In some examples, for a system that has le digital or synthetic Neugebauer Primaries (in a model that does not assume any overlap between adjacent drops), there will be $((k-1)*4+1)^n$ printed or 'effective' Neugebauer Primaries that may appear in the resultant print pattern (or model of a print pattern), allowing for size, shape, distribution and overlap of adjacent ink drops.

Step 303 involves determining at least one ink parameter for each ink printed by the printer from the colorimetry of each color patch and the halftone pattern for each color patch in the set of color patches. The at least one ink parameter may be selected from the group consisting of ink reflectances, ink opacities and Yule-Nielsen n values. In some examples, for each ink of the ink set printed by the printed, the ink reflectance, ink opacity and Yule-Nielsen n value is calculated. This may be calculated using Kubelka-Munk and/or Yule Nielsen modified Neugebauer models, to determine the parameter or parameters that most closely fit the measured colorimetry of the color patches and the model of the ink drops used to form the color patches that accounts for overlap of adjacent drops.

Step 304 involves using the at least one ink parameter for each ink to predict the colorimetry in the color space of the at least one Neugebauer Primary lying outside of the ink limit. The at least one parameter may also be used to predict the colorimetry of Neugebauer Primaries lying within the ink limit (the colorimetry of which may not have been measured in the color patches). In an example, the method may involve, for a given Neugebauer Primary for which the colorimetry is to be predicted: modelling the print pattern of drops that would form the given Neugebauer Primary, the model taking into account the size, shape and distribution of ink drops printed, including any overlap between ink drops, and then using the at least one parameter of the ink or inks used to form the Neugebauer Primary to predict its colorimetry in the color space. This prediction may use the Kubelka-Munk and Yule-Nielsen Neugebauer models.

In the method, step 203 in FIG. 2 may involve determining a plurality of Neugebauer Primary area coverage vectors that can produce a desired color, and comparing each vector against a predetermined criterion, and selecting a vector that meets the criterion, such that said vector can be used by the printer to produce the desired color in the color space. The criterion may be selected from the group consisting of minimal ink usage, color constancy and grain.

Figure 4:
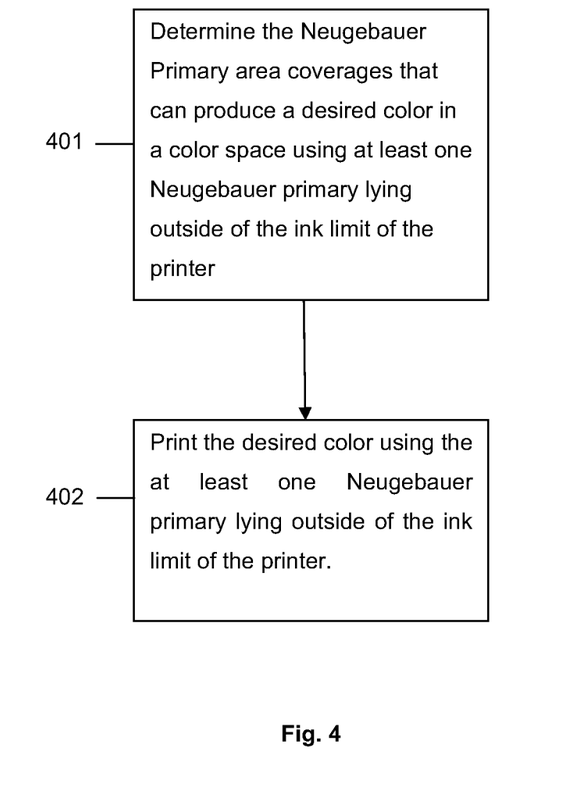
FIG. 4 illustrates schematically an example of a method of printing using a printer as described herein.

FIG. 4 illustrates an example of a method of printing using a printer. The present disclosure may relate to a system to carry out or implement a method of printing using a printer. The system may be adapted to and/or programmed to carry out the method of printing using a printer. The system may comprise machine readable instructions for carrying out the method of printing. The method may involve, in a step 401, determining the Neugebauer Primary area coverages that can produce a desired color in a color space using at least one Neugebauer Primary lying outside of the ink limit of the printer. Step 402 may involve printing the desired color using the at least one Neugebauer Primary lying outside of the ink limit of the printer. The method may involve, before determining the Neugebauer Primary area coverages that can produce a desired color in a color space, and predicting the colorimetry in the color space of at least one Neugebauer Primary lying outside of an ink limit for the printer. This may be carried out as described above. In an example, the predicting of the colorimetry in the color space of at least one Neugebauer Primary lying outside of an ink limit for the printer is based on the size, shape and distribution of the ink drops that are printed on a substrate by the printer. In an example, predicting of the colorimetry in the color space of at least one Neugebauer Primary lying outside of an ink limit for the printer is based on the overlap of ink drops that are printed on a substrate by the printer. In an example the method involves, before determining the Neugebauer Primary area coverages that can produce a desired color in a color space: printing a set of color patches on a substrate, obtaining colorimetry information for each patch in the set of color patches, modelling the halftone pattern for each of the patches in the set of color patches, the halftone pattern including the size, shape and distribution of ink drops printed to form each color patch, including any overlap between ink drops in the color patches, determining at least one ink parameter for each ink printed by the printer from the colorimetry of each color patch and the halftone pattern for each color patch in the set of color patches, using the at least one ink parameter for each ink to predict the colorimetry in the color space of the at least one Neugebauer Primary lying outside of the ink limit. The at least one ink parameter may be selected from the group consisting of ink reflectances, ink opacities and Yule-Nielsen n values.

Figure 5:
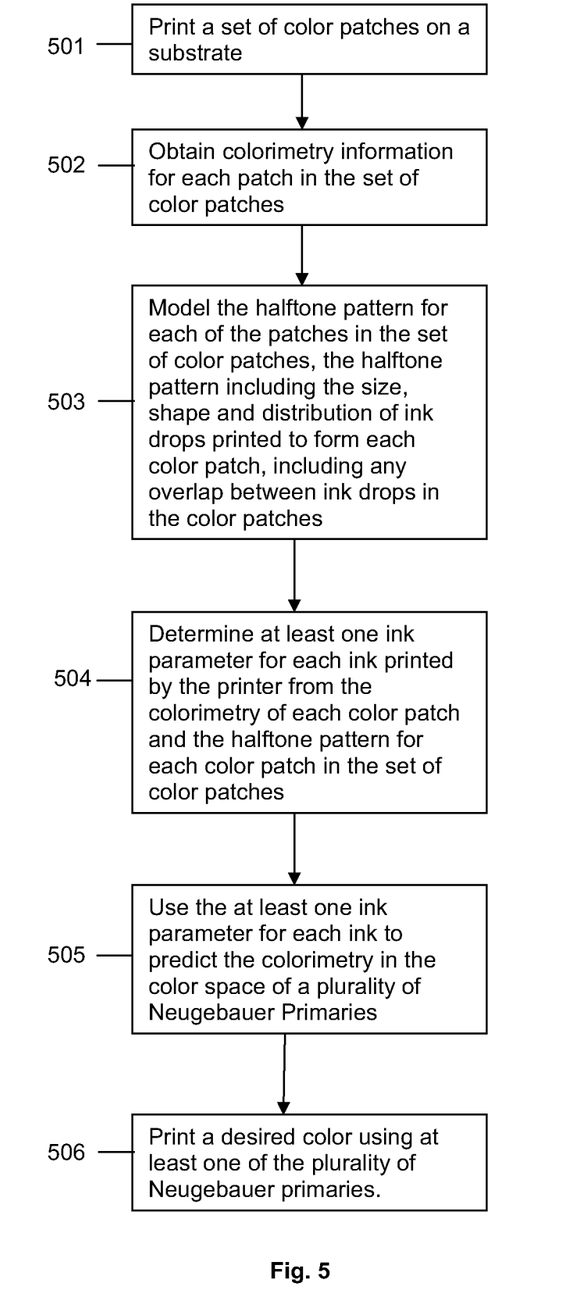
FIG. 5 illustrates schematically an example of a further method of printing using a printer as described herein.

FIG. 5 illustrates a further example of a method of printing using a printer. Step 501 may involve printing a set of color patches on a substrate. Step 502 involves obtaining colorimetry information for each patch in the set of color patches. Step 503 involves modelling the halftone pattern for each of the patches in the set of color patches, the halftone pattern including the size, shape and distribution of ink drops printed to form each color patch, including any overlap between ink drops in the color patches. Step 504 involves determining at least one ink parameter for each ink printed by the printer from the colorimetry of each color patch and the halftone pattern for each color patch in the set of color patches. Step 505 involves using the at least one ink parameter for each ink to predict the colorimetry in the color space of a plurality of Neugebauer Primaries. Step 506 involves printing a desired color using at least one of the plurality of Neugebauer primaries. In an example, the method involves using the at least one ink parameter for each ink to predict the colorimetry in the color space of the plurality of Neugebauer Primaries, at least one of which lies outside an ink limit for the printer.

Figure 6A:
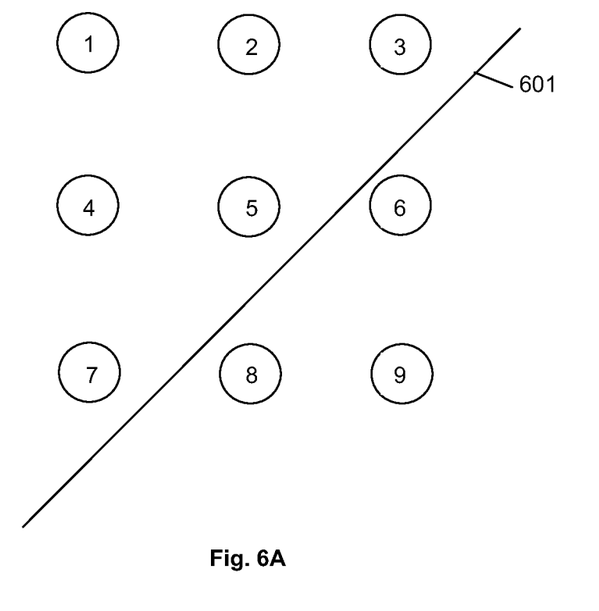
FIG. 6A illustrates schematically some Neugebauer Primaries (1 to 9) of a printer in a two-dimensional array; some of the Neugebauer Primaries lie inside an ink limit 601, and some lie outside of the ink limit.

FIG. 6A illustrates schematically a two-dimensional color space in which lie nine Neugerbauer Primaries, labelled 1 to 9. An ink limit for the printer is represented by line 601, with Neugebauer Primaries (NPs) 1, 2, 3, 4, 5 and 7 lying within the ink limit, and Neugebauer Primaries 6, 8 and 9 lying outside of the ink limit. The ink limit may represent a maximum amount of ink that can be printed in a unit area on a substrate. Printing across the entire unit area with NPs 6, 8 and 9 would exceed this ink limit, whereas printing across the entire unit area with the other NPs would not exceed the ink limit.

Figure 6B:
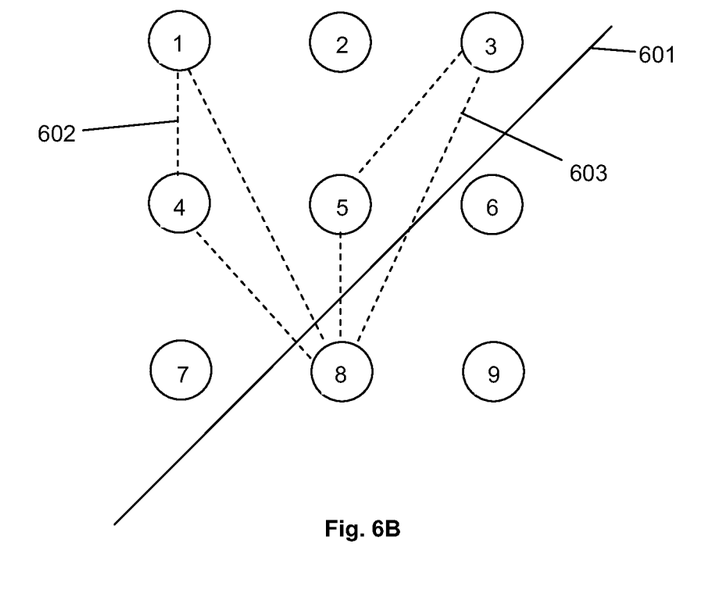
FIG. 6B illustrates schematically the two Neugebauer Primary area coverage vectors, one of which (602) is formed from Neugebauer Primaries 1, 4 and 8, and the other of which (603) is formed from Neugebauer Primaries 5, 3 and 8.

The colorimetry of NPs 1, 2, 3, 4, 5 and 7 can be measured accurately by printing a color patch of each NP, then measuring its colorimetry. However, it may be difficult for a printer to print a color patch of NPs 6, 8 and 9, owing to internal instructions that prevent printing over a large area with NPs that lie outside the ink limit. However, the colorimetry of NPs 6, 8 and 9 can be predicted. In some examples, this can be predicted by determining, for a given printer and print substrate, and for each ink of an ink set for the printer at least one print parameter. The print parameter may be as described herein. The print parameter may be used in combination with a model of ink drops that would be used to form the NPs 6, 8 and 9 to predict their colorimetry. In some examples, the model of ink drops takes into account to overlap of adjacent ink drops and/or the size, shape and distribution of ink drops. Once the colorimetry in the color space of NPs 6, 8 and 9 has been predicted, then these NPs can be used in the formation of Neugebauer Primary area coverage vectors. As illustrated in FIG. 6B, a vector 602 is formed from NPs 1, 4 and 8. Any color within this vector may be formed from the NPs 1, 4 and 8, with the relative weighting of the NPs for any given color within the vector being represented by the barycentric coordinates of the NPs 1, 4 and 8. Accordingly, the printer can be adapted to allow this vector to be printed. This may be allowed by a printer, for example, where the printing of NP 8 is compensated in an area by printing less inks around the given color, avoiding for a given area, the ink limit being exceeded. A further NPac vector is also shown in FIG. 6B, which is formed from NPs 3, 5 and 8.

Figure 7B:
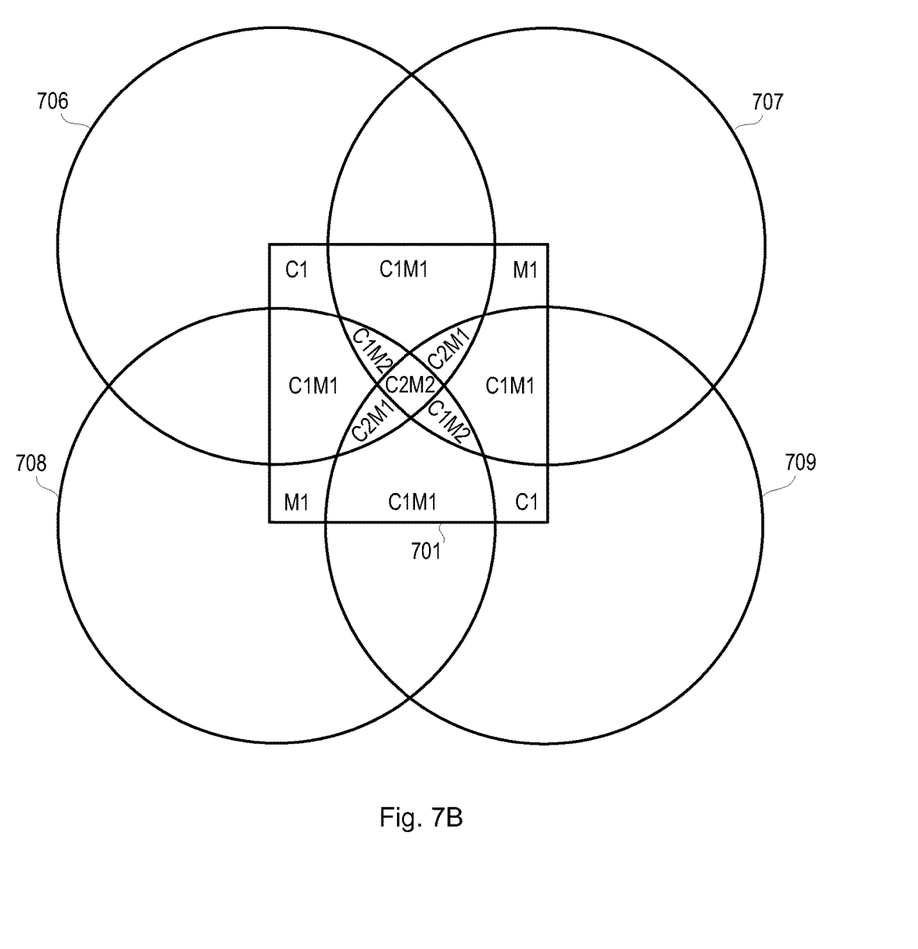
FIG. 7B illustrates a Neugerbauer Primary area coverage model that takes into account the size, shape, distribution and overlap of ink drops printed on a substrate.

FIG. 7A illustrates a synthetic, or digital, Neugebauer Primary that is formed from cyan and magenta inks. In particular, this Neugebauer Primary is formed from cyan ink blocks 702 and 705, and magenta ink blocks 703 and 704. In this Neugebauer Primary, the enclosed box 701 represents the repeating pattern of the NP. It can be seen that magenta would cover 50% of the area and cyan would cover the remaining 50% of the area. FIG. 7B represents a model of the Neugebauer Primary that would be formed on printing, with the cyan drops being represented by drops 706 and 709 and the magenta drops being represented by drops 707 and 708. Again, in this Neugebauer Primary, the enclosed box 701 represents the repeating pattern of the NP. As can be seen, because of the approximately circular nature of the actual drops, and their relative placing on the substrate, there is an overlap between the cyan and magenta inks, with C1 representing a single layer of cyan, M1 representing a single layer of magenta, C1M1 representing a combination of a single layer of cyan and single layer of magenta, C1M2 representing a combination of a single layer of cyan and two layers of magenta, and so on for the remaining CnMm designations. Here, 15% of the area is C1, 15% of the area is M1, 50% of the area is C1M1, 7.5% of the area is C1M2, 7.5% of the area is C2M1 and 5% of the area is C2M2. From measurement of the colorimetry for a plurality of Neugebauer Primaries, and models of the drop patterns that form the Neugebauer Primaries, ink parameters such as ink reflectances, ink opacities and Yule-Nielsen n values can be computed that most closely fit the data. These ink parameters can be used to predict the colorimetry of Neugebauer Primaries lying outside of a print limit, ideally by using models of ink drops that would form the Neugebauer Primaries that take into account size, shape and distribution of the ink drops, and in some examples, overlap of adjacent ink drops.

In some examples, the methods described herein may be controlled by and/or implemented by a computer and/or computer program product and/or machine readable instructions. There is further provided a computer program product for implementing and/or controlling the methods. The computer program product may be a non-transitory computer program product. A computer program product may be implemented in computing hardware and/or machine readable instructions, for example in the form of software. Non limiting examples of computer hardware may include any computer apparatus that can store, retrieve, process and/or output data and/or communicate with other computers. The results produced may be displayed on a display of the computing hardware. In some examples, machine readable instructions implementing the methods and/or computer program product may be recorded on computer-readable media which may comprise computer-readable recording media. In some examples, the computer readable media may be non transitory computer readable media. Non limiting examples of computer-readable recording media may include a magnetic recording apparatus, an optical disk, a magneto-optical disk, and/or a semiconductor memory (for example, RAM, ROM, etc.). Non limiting examples of magnetic recording apparatus include a hard disk device (HDD), a flexible disk (FD), and/or a magnetic tape (MT). Non limiting examples of an optical disk include a Digital Versatile Disc (DVD), a DVD-RAM, a Compact Disc (CD), a CD-ROM and/or a CD-RW. In some examples, a program or software implementing the product of the present disclosure may also be transmitted over transmission communication media such as carrier wave signals and/or distributed over a network such as a local area network or a global network such as the internet.

While the methods, systems and related aspects have been described with reference to certain examples, various modifications, changes, omissions, and substitutions can be made without departing from the spirit of the present disclosure. It is intended, therefore, that the methods, systems and related aspects be limited only by the scope of the following claims and their equivalents. The features of any dependent claim may be combined with the features of any of the independent claims or other dependent claims.

The invention claimed is:

1. A computer implemented method for color separation for a printer, the method comprising:
    forming a color gamut for the printer in the form of a hull in a color space, the hull having vertices corresponding to Neugebauer Primaries,
    predicting the colorimetry in the color space of at least one Neugebauer Primary lying outside of an ink limit for the printer,
    determining the Neugebauer Primary area coverages that can produce a desired color in the color space using at least one Neugebauer Primary lying outside of the ink limit.

2. The method according to claim 1, wherein the predicting of the colorimetry in the color space of the at least one Neugebauer Primary lying outside of an ink limit for the printer is based on the size, shape and distribution of the ink drops that are printed on a substrate by the printer.

3. The method according to claim 1, wherein predicting of the colorimetry in the color space of the at least one Neugebauer Primary lying outside of an ink limit for the printer is based on the overlap of ink drops that are printed on a substrate by the printer.

4. The method according to claim 1, wherein the predicting of the colorimetry in the color space of the at least one Neugebauer Primary lying outside of an ink limit for the printer is carried out by:
    obtaining colorimetry information for each color patch in a set of printed color patches from the printer,
    modelling the halftone pattern for each of the patches in the set of printed color patches, the halftone pattern including the size, shape and distribution of ink drops printed to form each color patch, including any overlap between ink drops in the color patches,
    determining at least one ink parameter for each ink printed by the printer from the colorimetry of each color patch and the halftone pattern for each color patch in the set of color patches,
    using the at least one ink parameter for each ink to predict the colorimetry in the color space of the at least one Neugebauer Primary lying outside of the ink limit.

5. The method according to claim 4, wherein the at least one ink parameter is selected from the group consisting of ink reflectances, ink opacities and Yule-Nielsen n values.

6. The method according to claim 1, wherein the determining Neugebauer Primary area coverages that can produce a desired color in the color space using at least one Neugebauer Primary lying outside of the ink limit involves:
    determining a plurality of Neugebauer Primary area coverage vectors that can produce the desired color, and comparing each vector against a predetermined criterion, and selecting a vector that meets the criterion, such that said vector can be used by the printer to produce the desired color in the color space.

7. The method according to claim 1, wherein the criterion is selected from the group consisting of minimal ink usage, color constancy and grain.

8. A system to implement a method of printing using a printer, the method comprising:
    determining the Neugebauer Primary area coverages that can produce a desired color in a color space using at least one Neugebauer Primary lying outside of the ink limit of the printer; and
    printing the desired color using the at least one Neugebauer Primary lying outside of the ink limit of the printer.

9. The system according to claim 8, wherein the method involves, before determining the Neugebauer Primary area coverages that can produce a desired color in a color space:
    predicting the colorimetry in the color space of at least one Neugebauer Primary lying outside of an ink limit for the printer.

10. The system according to claim 9, wherein predicting of the colorimetry in the color space of at least one Neugebauer Primary lying outside of an ink limit for the printer is based on the overlap of ink drops that are printed on a substrate by the printer.

11. The system according to claim 8, wherein the predicting of the colorimetry in the color space of at least one Neugebauer Primary lying outside of an ink limit for the printer is based on the size, shape and distribution of the ink drops that are printed on a substrate by the printer.

12. The system according to claim 8, wherein the method involves, before determining the Neugebauer Primary area coverages that can produce a desired color in a color space:

printing a set of color patches on a substrate, obtaining colorimetry information for each patch in the set of color patches, modelling the halftone pattern for each of the patches in the set of color patches, the halftone pattern including the size, shape and distribution of ink drops printed to form each color patch, including any overlap between ink drops in the color patches, determining at least one ink parameter for each ink printed by the printer from the colorimetry of each color patch and the halftone pattern for each color patch in the set of color patches, using the at least one ink parameter for each ink to predict the colorimetry in the color space of the at least one Neugebauer Primary lying outside of the ink limit.

13. The system according to claim 12, wherein the at least one ink parameter is selected from the group consisting of ink reflectances, ink opacities and Yule-Nielsen n values.

14. A method of printing using a printer, the method comprising:

printing a set of color patches on a substrate, obtaining colorimetry information for each patch in the set of color patches, modelling the halftone pattern for each of the patches in the set of color patches, the halftone pattern including the size, shape and distribution of ink drops printed to form each color patch, including any overlap between ink drops in the color patches, determining at least one ink parameter for each ink printed by the printer from the colorimetry of each color patch and the halftone pattern for each color patch in the set of color patches, using the at least one ink parameter for each ink to predict the colorimetry in the color space of a plurality of Neugebauer Primaries, printing a desired color using at least one of the plurality of Neugebauer primaries.

15. A method according to claim 14, wherein the method involves using the at least one ink parameter for each ink to predict the colorimetry in the color space of the plurality of Neugebauer Primaries, at least one of which lies outside an ink limit for the printer.

* * * * *